United States Patent [19]

Challeton et al.

[11] 4,047,801
[45] Sept. 13, 1977

[54] OPTICAL WAVE GUIDE HAVING DISTRIBUTED GYROTROPY

[76] Inventors: Didier Challeton, 18, avenue de l'Europe, 38120 St Egreve; Philippe Coeure, 11, place Jean Moulin, 38000 Grenoble; Jean Pierre Jadot, 6, impasse des Lecheres, 38240 Meylan; Jean Claude Peuzin, Lotissement des 4 Seigneurs, 38320 Eybens, all of France

[21] Appl. No.: 669,887

[22] Filed: Mar. 24, 1976

[30] Foreign Application Priority Data

Apr. 2, 1975 France .................. 75.10296

[51] Int. Cl.$^2$ .................. G02B 5/14
[52] U.S. Cl. .................. 350/96 WG
[58] Field of Search .................. 350/96 WG

[56] References Cited

U.S. PATENT DOCUMENTS 3,830,555  8/1974  Warner .................. 350/96 WG

OTHER PUBLICATIONS

Wang et al., "Studies of the Use of Gyrotropic & Anisotropic Materials for Mode Conversion in Thin-Film Waveguide," J. Appl. Phys., vol. 43, No. 4, Apr. 1972.
Wang et al., "Studies of Magnetooptic Effects for Thin-Film Optical Waveguide Applications," IEEE Transactions, vol. Mag 7, No. 3, Sept. 1971, pp. 385–387.
Wang et al., "Wave Propagation in Thin-Film Optical Waveguides Using Gyrotropic & Anisotropic Substrates," IEEE J. of Quantum Electronics, vol. QE8, No. 2, Feb. 1972.
Wang et al., "Eigenmode Analysis of Wave Propagation in Optical Waveguides Deposited on Gyrotropic & Anisotropic Substrates," J. Appl. Phys., vol. 44, No. 7, July 1973.

*Primary Examiner*—Edward S. Bauer
*Assistant Examiner*—Stewart Levy
*Attorney, Agent, or Firm*—Burgess, Ryan and Wayne

[57] ABSTRACT

The wave guide is constituted by a film layer $C_1$ of magnetizable material having a constant refractive index $n_1$ and placed between two media having refractive indices of lower value than the index $n_1$. The layer $C_1$ has two flat parallel surfaces which separate the layer $C_1$ from the two media which have lower refractive indices and is constituted by a plurality of adjacent regions forming parallel layers, the gyrotropy of at least two of these regions being different.

13 Claims, 19 Drawing Figures

| | | | |
|---|---|---|---|
| $\delta yz$ | 0 | 0 | $i\delta$ |
| $\delta xz$ | 0 | $i\delta$ | 0 |
| $\delta xy$ | $i\delta$ | 0 | 0 |

OPTICAL WAVE GUIDE HAVING DISTRIBUTED GYROTROPY

This invention relates to an optical wave guide having distributed gyrotropy within the thickness. The wave guide is employed either for increasing the value of the coupling coefficient between two modes of propagation of electromagnetic waves within said guide or for increasing the variation resulting from a given excitation in the phase velocity of an electromagnetic wave of given mode within said guide, the wavelength of the modes of propagation being located within the optical range.

In more general terms, the invention relates to an optical wave guide for channelling and converting modes of propagation of electromagnetic waves in the range of optical wavelengths. It is a known fact that light can be propagated in "guided modes" within an optical wave guide in a manner which is similar to the propagation of electromagnetic waves (in the Hertzian range) within metal-walled wave guides.

At the present time, considerable efforts are being devoted to the investigation of phenomena associated with propagation and control of light waves within wave guides which are constituted in the majority of cases by thin dielectrics. The final objective of these researches is the use of such wave guides for the transfer of information in the optical range and in the field of communication. The transfer of information in the optical range offers an advantage over the Hertzian range since the higher frequency of optical vibrations permits modulation in the vicinity of the carrier frequency within a frequency band having a width which is several thousand times that of the Hertzian range. Moreover, the advent of the laser has considerably facilitated the formation of guided light beams.

The wave guides employed are usually constituted by a transparent film layer $C_1$ having a refractive index $n_1$, a thickness $e_1$ of the order of a few microns deposited on a substrate which is also transparent and has a refractive index $n_2 < n_1$. Said medium having a refractive index of lower value than the index of the transparent layer $C_1$ serves as a material support.

Similarly, the medium $C_3$ placed above the layer $C_1$ must have an index $n_3$ which is lower than the index $n_1$ of the layer $C_1$. Said medium could simply be air although a dielectric film would endow the wave guide (essentially constituted by the layer $C_1$) with higher mechanical strength and better resistance to external agents. As a result of the higher refractive index $n_1$ of the layer $C_1$, the waves which propagate within said layer undergo the phenomenon of total reflection from the top and bottom faces of the layer $C_1$ are are thus confined and guided.

For a more precise description of the propagation of these waves within dielectric film layers, reference can usefully be made to the following articles:

Guided Wave Optics, Proceedings of the I.E.E.E., volume 62, No 8, Aug., 1974 (Taylor and Yariv),
Journal of Applied Physics, volume 45, No 2, Feb. 1974 (Sadahiko Yamamoto and Toshio Makimoto);
full explanatory details in regard to these modes of propagation can be obtained from these articles which form an integral part of the description.

Two families of modes are capable of propagating within these wave guides, namely the transverse electric (TE) modes and the transverse magnetic (TM) modes. These are the two possible polarizations of the light wave. Different modes can exist in each of these polarizations, namely the modes 0, 1, 2 . . . etc. Throughout the following description, calculations will be simplified by considering only a wave guide having an infinite dimension along one direction $Oy$. However, the invention is also concerned with wave guides having finite dimensions and a rectangular, circular or other cross-section, for example, in which case the calculations are more complex but strictly of the same nature and evident to any one versed in the art.

Since both the transverse electric and magnetic (TE and TM) modes propagate within a wave guide, it is often necessary to excite one mode and to transfer the energy contained in this mode into another mode for reasons of switching and utilization of these modes at the exit of the wave guide (in the construction of integrated optical circuits). For the same reasons, it is also found necessary in many instances to vary the velocity of propagation of a given mode without carrying out a coupling between modes.

These two operations can be performed in different ways under the action of different excitations. It is possible in particular to employ the electro-optical effect which consists of a variation in refractive index of a material under the action of an electric field or the magneto-optical effect which represents the influence of a magnetization on the optical index.

In the prior art, the utilization of the magneto-optical effect for mode coupling is carried out within layers in which the magnetization was constant along the direction at right angles to the surfaces delimiting the layer $C_1$ in which the optical waves propagate.

The precise aim of the present invention is to provide an optical wave guide constituted by a layer $C_1$ formed of magnetizable material having an optical index $n_1$ and a thickness $e_1$ surrounded by two media having an optical index of lower value than the index $n_1$, the layer $C_1$ being constituted by a plurality of adjacent regions having substantially the same index $n_1$ but having on the other hand different directions of magnetization of magneto-optical characteristics.

To give a broader definition, the optical wave guide according to the invention has distributed gyrotropy within the thickness. By distributed gyrotropy is meant a variation according to thickness of the parameter or parameters $\delta$, namely the non-diagonal terms of the permittivity tensor which is characteristic of the material constituting the layer $C_1$. This variation in gyrotropy can be due either to a variation in chemical composition of the material or, more frequently, to rotation of the residual magnetization vector within the material.

As will be seen later, this variable gyrotropy according to thickness of the layer $C_1$ permits much more effective coupling of the modes existing within the material constituting the layer $C_1$. Accordingly, it is possible to choose and adapt the non-diagonal terms of the permittivity tensor in order to optimize the coefficient K of coupling between two given modes of geometrical configurations or in the case of one given mode to optimize the variation in propagation velocity resulting from a given excitation.

In a preferential embodiment of the invention, the wave guide and more especially the layer $C_1$ is constituted by parallel and adjacent layers $C_1^1, C_1^2 \ldots C_1^i$, the directions of magnetization within these different layers being perpendicular. The usual limit consists of two layers $C_1^1$ and $C_1^2$.

In another embodiment, the wave guide and more especially the layer $C_1$ is constituted by parallel and adjacent layers $C_1^1$, $C_1^2 \ldots C_1^i$ having parallel directions of magnetization but different magneto-optical characteristics, for example when said layers are formed of different materials.

In these embodiments of the invention, either the magnetization, the nature and the thickness of the layers $C_1^1$ and $C_1^2$ are determined so as to optimize the coefficient of coupling K between two given modes such as the fundamental modes, for example, so that the nature and magnetization of the layers determine the value of the non-diagonal coefficients of the permittivity tensor and the thicknesses of the layers permit adaptation of these values for the interaction of particular modes or else the same values are determined in order to optimize the rate of variation in the propagation velocity of a given mode as a result of a given excitation.

Further properties and advantages of the invention will become more readily apparent from the following description of exemplified embodiments which are given by way of explanation without any limitation being implied, reference being made to the accompanying drawings, wherein.

As already mentioned in the foregoing, the layered structure of the optical guide in accordance with the invention makes it possible to optimize the coupling between two modes which propagate within the guide. The coupling between two modes is established by means of the dielectric permittivity tensor of the material; said tensor relates the electric induction vector D to the electric field E. In the presence of a magnetic field and in a magneto-optical medium (ferromagnetic or ferrimagnetic medium) which is assumed to have cubic symmetry in order to simplify the analysis, the dielectric permittivity tensor is of the form:

$$a_{ij} = \begin{vmatrix} n_1^2 & i\delta xy & i\delta xz \\ -i\delta xy & n_1^2 & i\delta yz \\ -i\delta xz & -i\delta yz & n_1^2 \end{vmatrix}$$

The diagonal terms are equal to the square of the optical index (in this case $n_1^2$) and the non-diagonal terms are purely imaginary. Moreover, the tensor is antisymmetrical with respect to the principal diagonal. It is readily apparent that simplification to a crystal of cubic symmetry is given solely by way of indication and in order to clarify the calculations. The crossed terms $\delta ij$ result from the magneto-optical effects. Said terms are dependent on the direction of magnetization within a given material and of course on the nature of the material.

Coupling between two waves, that is, the transfer of energy from one wave to the other, takes place proportionally to a coupling coefficient K, the expression of which is given by the formula:

$$K = \int_V \vec{D}.\vec{E}\, dV$$

where V is the volume in which interaction takes place.

By reason of the distribution of the electric fields resulting from the various modes and the relation $D_i = a_{ij}E_j$, it will be endeavored to optimize the value of this integral which gives the coupling coefficient K in order to carry out transfer of energy from one wave to another. This coupling coefficient K is proportional to the value of the interaction electrical energy which is stored in the material.

Figure 1A:
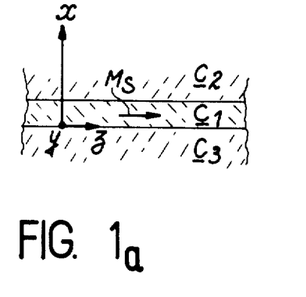
FIGS. 1a, 1b, 1c and 1d show the different directions of magnetization of the layer $C_1$ and the associated terms $\delta\,ij$ of the permittivity tensor.
Figure 1B:
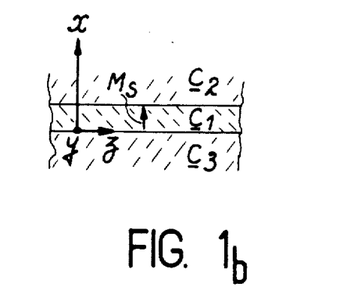
Figure 1C:
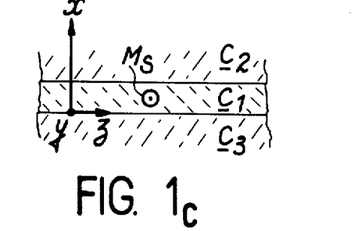
Figure 1D:
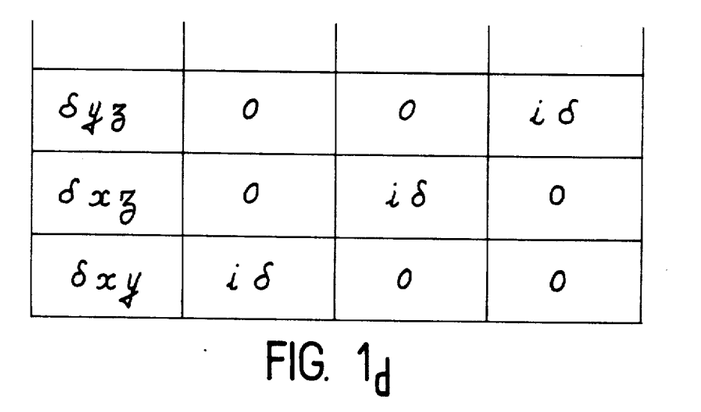

FIGS. 1a, 1b and 1c show different configurations, that is, the longitudinal, equatorial and polar configurations respectively of the magnetic field within layers $C_1$ and FIG. 1d gives the non-diagonal coefficients $\delta$ of the permittivity tensor associated with these different configurations.

In one preferential embodiment of the invention, the layer $C_1$ is constituted by a juxtaposed arrangement of the different layers $C_1$ shown in FIGS. 1a, 1b and 1c, the orientation domains being perpendicular to each other.

Figure 2A:
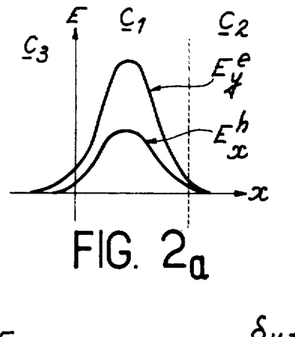
FIGS. 2a and 2b show the configuration of the coupled fields in respect of the 0 modes in the case of longitudinal magnetization and the possible values of $\delta\,xy$.

In the case of the longitudinal configuration, the coefficient K of coupling between the TE and TM waves is proportional to an integral of the form:

$$K \alpha \int_{-\infty}^{+\infty} \delta xy\, E_y^e(x)\, E_x^h(x) dx \qquad (1)$$

where $E_y^e(x)$ and $E_x^h(x)$ are the electric fields associated respectively with the TE and TM modes. The indices y and x designate the components of said fields along Oy and Ox. The values of these electric fields are determined by means of Maxwell's equations and are characteristic of the modes considered. In the case of modes of the order O, these functions have the shape shown in FIG. 2a.

Figure 2B:
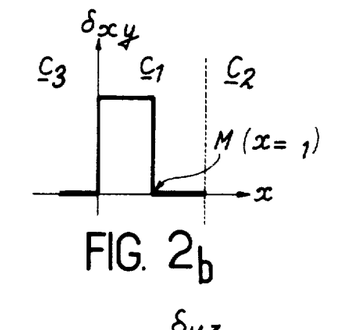

In this case, the fields $E_y^e$ and $E_x^h$ have the same sign within the interval $[-\infty, +\infty]$. Consequently, the maximum value of the energy integral (I) is obtained in respect of a uniform distribution of $\delta xy$ along x. In the event of deviation of this uniform distribution, the coupling coefficient decreases; thus in the case of the distribution shown in FIG. 2b, there is a loss in the value of the coupling coefficient K by a factor of 2. In conclusion, the distributed gyrotropy is not of great interest in the case of the longitudinal configuration.

On the other hand, in the case of the polar configuration shown in FIG. 1c, the coupling coefficient is proportional to an integral (II):

$$\qquad (II)$$

-continued $$K \alpha \int_{-\infty}^{+\infty} \delta yz \, E_y^e(x) E_z^h(x) \, dx$$

Figure 3A:
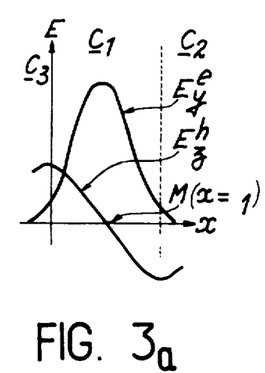
FIGS. 3a, 3b and 3c show the configuration of the coupled fields in respect of the 0 modes in the case of polar magnetization and the advantageous values of the $\delta\,yz$ coefficient.
Figure 3B:
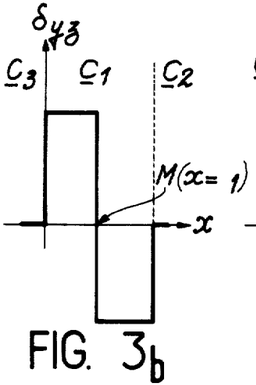

FIG. 3a gives the shape of the distribution $E_y^e(x)$ and $E_z^h(x)$ in the case of modes of order O. It is noted that the function $E_z^h$ is reduced to zero and changes sign at a point M which is located substantially at the center of the layer $C_1$. Moreover, the function $E_y^e$ is practically symmetrical with respect to the point M whereas $E_z^h$ is practically antisymmetrical with respect to the same point. In consequence, if $\delta yz$ is constant, the product given by the integral is very close to O. On the other hand, if $\delta yz$ is distributed in accordance with FIG. 3b, that is to say with nullification and change of sign of the magnetization, the integral (II) will have a maximum value.

Figure 3C:
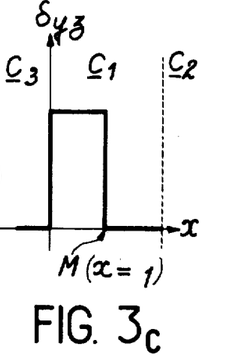

Another acceptable distribution $\delta yz$ is shown in FIG. 3c. In this case, the coupling will be twice as small as in the previous case, which remains advantageous and in some cases easier to carry into effect. Thus, in the case of the polar configuration, the distributed gyrotropy makes it possible to maximize the coefficient of coupling between the TE and TM modes.

Figure 4A:
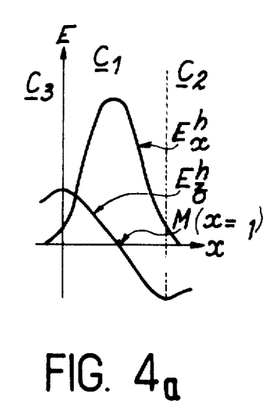
FIGS. 4a, 4b and 4c show the configuration of the coupled fields in respect of the TMO mode in the case of equatorial magnetization and the advantageous values of the $\delta\,xz$ coefficient.
Figure 4B:
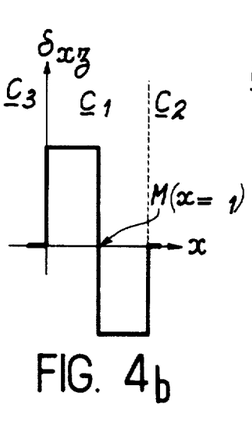
Figure 4C:
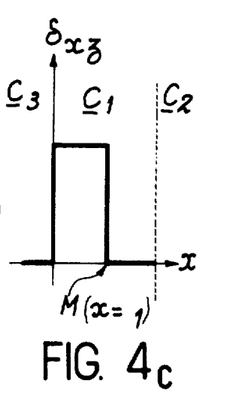

As mentioned earlier, the layered structure of the optical wave guide in accordance with the invention also makes it possible to optimize the variation in phase velocity as a result of a given excitation of a wave which propagates within the guide. This is always obtained in the case of the equatorial configuration of FIG. 1b; the contribution $\Delta\beta$ arising from the magnetism at the propagation constant is in fact given in this case by:

$$\Delta\beta\alpha \int_{-\infty}^{+\infty} \delta xy \, E_z^h(x) \, E_y^h(x) \, dx \qquad (III)$$

where $\Delta\beta$ is the variation in the value of the wave vector of the TM wave resulting from the magneto-optical effect and wherein the field components employed are only those of one and the same TM mode. FIG. 4a shows the method adopted for distributing the fields $E_x^h$ and $E_z^h$ in one section of the guide and in the case of the mode of order O. As in the foregoing, it is apparent that these two functions are nearly orthogonal and this results in a value of the integral (III) which is very close to O if $\delta xz$ is constant. In this case also, a distribution of $\delta xz$ of the type shown in FIGS. 4b and 4c makes it possible to optimize the value of the coefficient $\Delta\beta$.

Figure 5A:
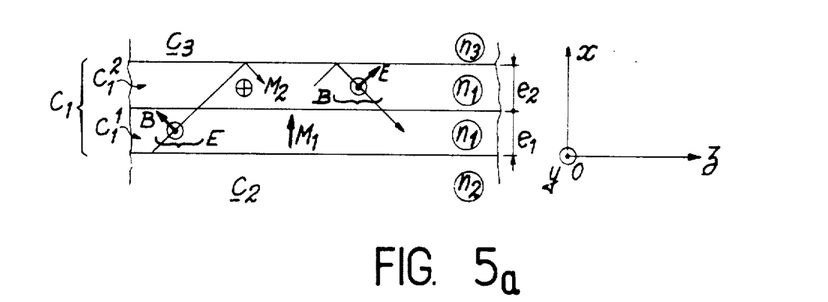
FIGS. 5a and 5b show one example of wave guide having two magnetic film layers and the values of the coefficients of the associated permittivity tensor.
Figure 5B:
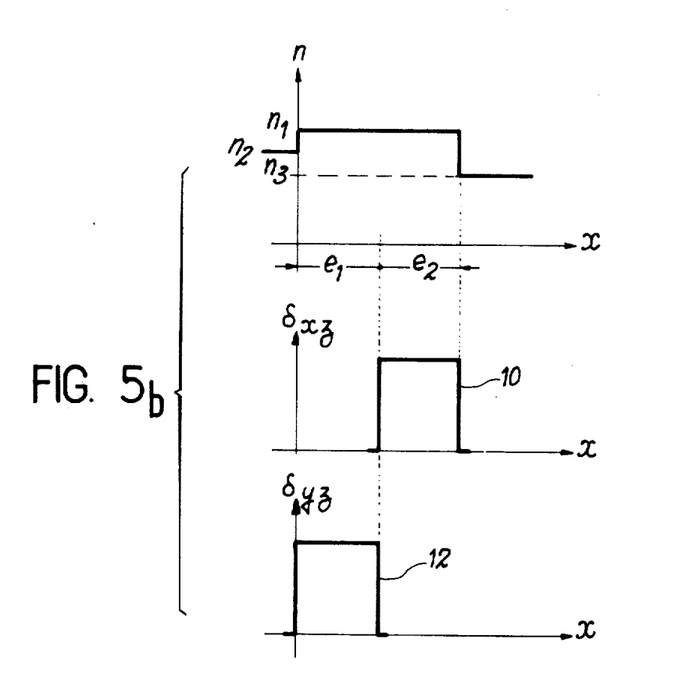

In FIG. 5a, there is shown one example of a wave guide in which the distributed gyrotropy is obtained by rotation of magnetization in a material of uniform chemical composition; this wave guide has a layer $C_1$ constituted by two adjacent layers $C_1^1$ and $C_1^2$ having the same index $n_1$ and placed between two layers $C_2$ and $C_3$ in which the respective optical indices $n_2$ and $n_3$ are lower in value than the optical index $n_1$ which is common to the two layers $C_1^1$ and $C_1^2$. The optical indices $n$ have values as a function of the abscissa $x$ shown in FIG. 5b which is associated with FIG. 5a and the coefficients $\delta xz$ and $\delta yz$ of the permittivity tensor have variations as shown on curves 10 and 12 of FIG. 5b. There is also shown in FIG. 5a the orientation of the magnetizations $M_1$ and $M_2$ respectively and the polarizations of the TE and TM waves. In this exemplified embodiment, the substrate $C_3$ is a single crystal of gadolinium gallate and the layer $C_1$ is deposited by epitaxial growth in liquid phase on a polished face of the substrate $C_3$ along the crystallographic direction <111>. The chemical composition of the layer $C_1$ is: $Gd_{0.5}Y_{2.5}Fe_{4.08}Ga_{0.92}O_{12}$. The thickness of the layer is $e_1 + e_2 = 4$ microns. The rotation of the direction of magnetization from $M_1$ and $M_2$ is obtained by ion implantation. The ions employed are protons of 300 keV energy and the dose is $5 \times 10^{15}$ ions/cm$^2$. This makes it possible to adjust the values of $e_1$ and $e_2$ to 2 microns.

The directions of magnetizations are determined by the action of steady magnetic fields which can readily be produced by small permanent magnets.

Figure 6A:
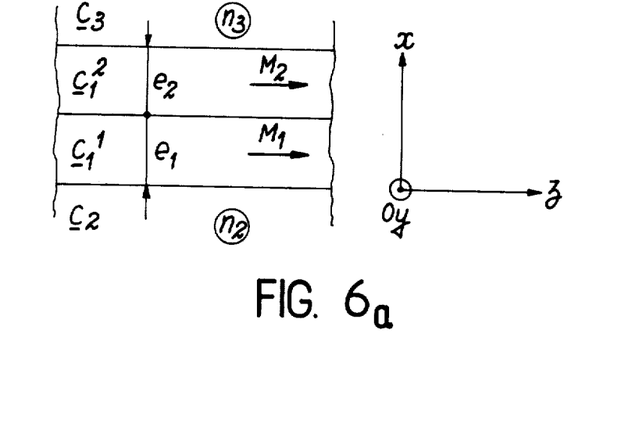
FIGS. 6a and 6b show a further example of wave guide having two magnetic film layers and the values of the coefficients of the associated permittivity tensor.
Figure 6B:
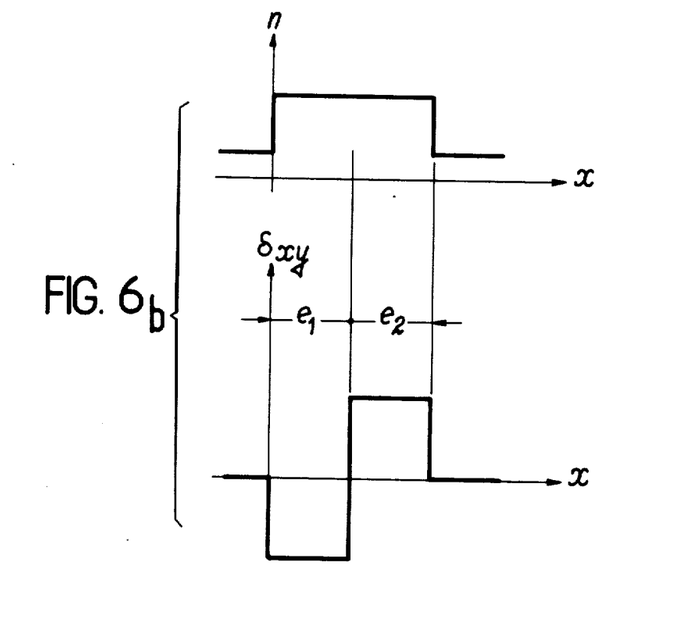

In FIG. 6a, there is shown one example of a wave guide in which the distributed gyrotropy is obtained by means of two materials which are chemically distinct but have substantially the same index $n_2$; said wave guide has a layer $C_1$ constituted by two layers $C_1^1$, $C_1^2$ having parallel magnetizations $M_1$ and $M_2$. The substrate $C_2$ is a single crystal of gadolinium gallate and the layer $C_1$ is deposited by epitaxial growth in liquid phase on the polished face <111> of the substrate $C_3$. The composition of the layer $C_1^1$ is $Gd_{0.6}Y_{2.4}Fe_{4.3}Gd_{0.7}O_{12}$. The thickness $e_1$ of the layer $C_1^1$ is equal to 2 microns and the thickness of the layer $C_1^2$ deposited by the same method as the layer $C_1$ by utilizing a different bath is also equal to 2 microns. The chemical composition of the layer $C_1^2$ is $Yb_{2.3}Pr_{0.7}Fe_4Ga_1O_{12}$. This coupling coefficient $\delta xy$ has variations as shown in FIG. 6b in respect of the same direction of magnetic magnetization within the two materials of the layers $C_1^1$ and $C_1^2$. In this case, the composition changes between the two materials which constitute the layers $C_1^1$ and $C_1^2$.

Figure 7:
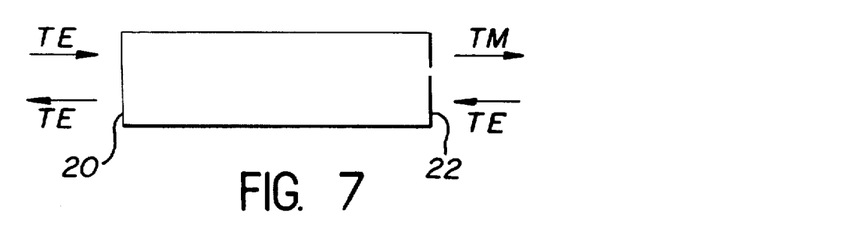
FIG. 7 is a schematic diagram of a unidirectional mode converter.

The invention makes it possible by considerably increasing the mode coupling by a factor of one hundred to one thousand in the polar and equatorial configurations to make use of the wave guides as mode couplers in a large number of applications. In all these applications, reference can advantageously be made to the article of Yamamoto et al. cited earlier. This article described structures having a nonreciprocal effect for use in guided wave optics. These structures have properties which are dependent on the direction of light propagation. As described in the article by Yamamoto, it is possible to form within a wave guide a unidirectional mode converter such that a TE mode which enters through an entrance face 20 is completely converted to a TM mode at an exit face 22 whereas a TE mode which enters at the face 22 emerges from the face 20 without any change. This type of structure is shown diagrammatically in FIG. 7. As mentioned in the article by Yamamoto, this converter has three successive sections of length $L_1$, $L_2$, $L_3$ in which the magnetizations are respectively longitudinal, equatorial and polar from 20 to 22. The use of magneto-optical wave guides of conventonal type having uniform gyrotropy according to the thickness would result in very unequal length $L_1$, $L_2$, $L_3$ with, for example:

$$L_2 = L_3 = 100 \text{ to } 1000 \, L_1$$

In practice, this entails the need for considerable total lengths which are incompatible among other things with the characteristic absorption of the materials employed. On the other hand, the use of wave guides having distributed gyrotropy results in values $L'_1$, $L'_2$, $L'_3$ which are typically of the order of:

$L'_1 \sim 2L_1; L'_3 \sim 5 \text{ to } 10 \ l'_1$

It is apparent that the ratios $L'_2/L'_1$ and $L'_3/L'_1$ are reduced to 10 to 200 times. This results in a total length of the device which is much too short. In order to give a clear idea, a numerical calculation which is not reproduced in this patent specification gives $L_1 + L_2 + L_3 = 600$ mm and $L'_1 + L'_2 + L'_3 = 15$ mm. It can be understood that a device mentioned in the cited article by Yamamoto can be carried into practical effect by means of the present invention.

Figure 8:
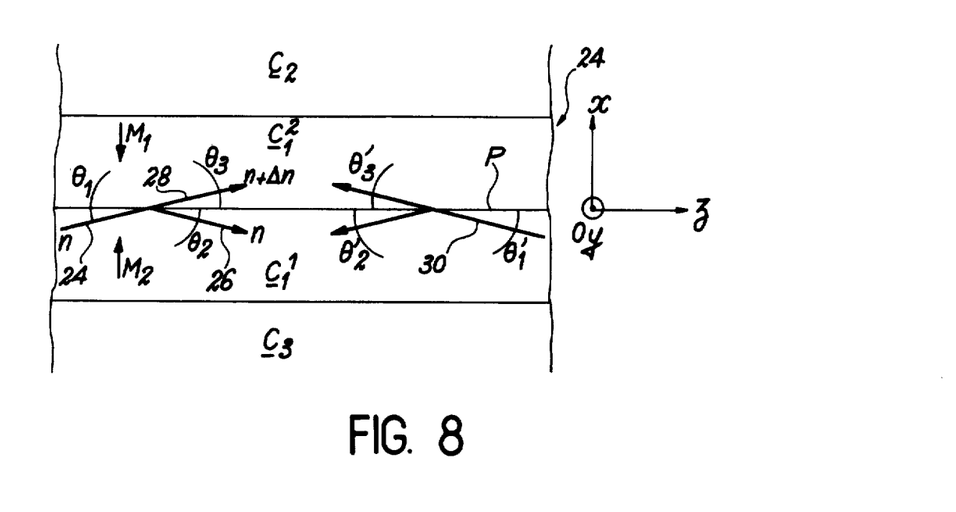
FIGS. 8 and 9 show one form of construction of an isolator.

Similarly, there is shown in FIG. 8 a magneto-optical wave guide 24 containing two 180° magnetization domains in which the directions of magnetization are parallel to the plane xOz of the wave guide. The infinitely thin wall P which is parallel to the plane yOz is perpendicular to the direction of magnetization. This constitutes a nonreciprocal reflector which utilizes a wall P between two domains. In fact, if consideration is given to the propagation of TM waves along practically equatorial directions (ray 24), namely directions which are practically parallel to the wall P, it is shown theoretically that in the case of waves of this type, the effective index $n$ undergoes a change $\Delta n$ if either the direction of propagation or the direction of magnetization is changed. For these reasons, the wall behaves in the same manner as a dioptric element on which the TM wave undergoes a reflection 26 and a refraction 28. This is illustrated in FIG. 8 which defines the angles $\theta_1$, $\theta_2$ and $\theta_3$ which are associated with the incident ray 24, the reflected ray 26 and the refracted ray 28 as well as the corresponding effective indices. A relation is established between $\theta_1$, $\theta_2$ and $\theta_3$ by Descartes' law:

$$n \cos \theta_1 = (n + \Delta n) \cos \theta_3$$

$$|\theta_1| = |\theta_2|$$

It is seen in particular that if $\Delta n$ is negative, there exists in the case of $\theta_1$ a limiting value $\theta c$ below which the incident ray 24 is totally reflected from the wall:

$$\theta c \sqrt{\frac{|\Delta n|}{n}}$$

On the other hand, an incident ray 30 which propagates in the direction opposite to the preceding cannot undergo total reflection from the wall. The wall P acts as a nonreciprocal reflector and the ray 30 which does not undergo total reflection is finally attenuated by the losses within the two adjacent media. In practice, if a conventional wave-guide structure is employed (without distributed gyrotropy), the value of $\Delta n/n$ which one may expect to obtain is of the order of $10^{-5}$. From this it follows that $\theta c = 0.18°$ but this value cannot readily be utilized in practice. By contrast, the use of the distributed gyrotropy mode in accordance with the invention makes it possible to obtain $\Delta n/n = 10^{-3}$ and consequently $c = 1.8°$. This value becomes acceptable for practical applications.

Figure 9:
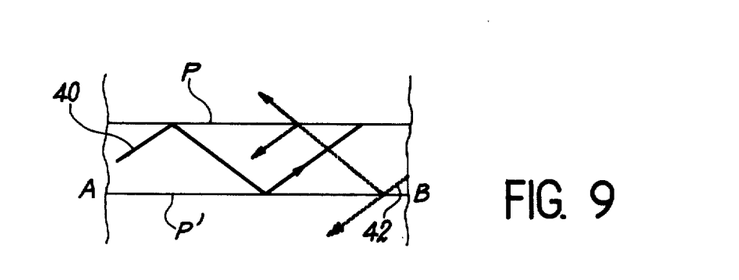

Accordingly, FIG. 9 illustrates the association of two walls P and P' for constructing an isolator. The TM wave 42 which enters at B is poorly transmitted by reflection since it does not undergo the phenomenon of total reflection. On the other hand, the TM wave 40 which enters at A is very well transmitted by total reflection.

It will be noted that the example of application of the invention as described in FIGS. 8 and 9 falls into the category in which a variation in phase velocity of a wave of a predetermined mode is produced in the presence of an excitation which is static in the present instance and constituted by the existence of two 180° magnetization domains.

The invention could also be combined with the device described in French patent Application No EN 75 10295 filed on this day and entitled "Optical wave guide for carrying out phase-tuning between two modes of light propagation," with a view to optimizing the coupling between the modes of propagation with the layer $C_1$.

What we claim is:

1. An optical wave guide comprising a layer $C_1$ of magnetizable material having a substantially constant optical index of refraction equal to $n_1$ throughout said layer and a predetermined thickness disposed between two parallel media each having an optical index of refraction of lower value than the index $n_1$, the said predetermined thickness $C_1$ corresponding to the distance between said media, wherein the layer $C_1$ exhibits distributed gyrotropy as herein defined and comprises a plurality of adjacent regions constituting sublayers which are parallel to each other and has two parallel flat surfaces which separate the layer $C_1$ from the two media having optical indices of lower value than the index $n_1$.

2. A wave guide according to claim 1, wherein the adjacent regions of the layer $C_1$ have parallel directions of magnetization and have different non-diagonal terms in their respective permittivity tensors.

3. A wave guide according to claim 1, wherein the adjacent regions of the layer $C_1$ have different directions of magnetization.

4. A wave guide according to claim 3, wherein the adjacent regions of the layer $C_1$ have different chemical compositions.

5. An optical wave guide according to claim 1 constituted by sublayer $C_1{}^1$, $C_1{}^2$, $C_1{}^3$ ... $C_1{}^i$ which are parallel and adjacent along surfaces parallel to a plane yOz, Ox, Oy and Oz constituting an ortho-normal trihedron, wherein the directions of magnetization of each sublayer $C_1{}^i$ are parallel to one of the three axes Ox, Oy and Oz.

6. An optical wave guide according to claim 5 and employed as coupling medium for two modes of wave propagation along the axis Oz within said layer $C_1$, a transverse electric (TE) mode and a transverse magnetic (TM) mode, wherein the respective thicknesses of said sublayers and the directions of magnetizations within said layers are chosen as a function of two predetermined modes so as to optimize the value of the coefficient of coupling K between said two TE and TM modes.

7. An optical wave guide according to claim 5, wherein said guide comprises two adjacent sublayers and of substantially equal thickness and formed of the same magnetic material, the directions of magnetization within said two layers being perpendicular.

8. An optical wave guide according to claim 7, wherein one sublayer is oriented magnetically along the axis Ox and the other sublayer is oriented magnetically along the axis Oy.

9. An optical wave guide according to claim 7, wherein one sublayer is oriented magnetically along the axis Oy and the other sublayer along the axis Oz.

10. An optical wave guide according to claim 7, wherein one sublayer is oriented magnetically along the axis Ox and the other sublayer along the axis Oz.

11. An optical wave guide according to claim 1 wherein respective ones of said sublayers have respective thicknesses and directions of magnetization choosen as a function of the mode to be transmitted in the wave guide so as to optimize the contribution resulting from the magnetism to the propagation constant of said mode.

12. An optical wave guide comprising a layer $C_1$ of magnetizable material having a substantially constant optical index equal to $n_1$ throughout said layer, said layer $C_1$ being disposed between two media each having an optical index of lower value than the index $n_1$, said layer $C_1$ having a predetermined thickness corresponding to the distance between said media, wherein said layer $C_1$ comprises at least two adjacent regions disposed along planes parallel to the interface between the layer $C_1$ and the media placed on each side of said layer, at least one of the values of the non-diagonal and non-zero terms of the permittivity tensor being different from one of said regions to the other of said regions.

13. An optical wave guide according to claim 12, wherein the non-diagonal and non-zero term $\delta_{ij}$ of the permittivity tensor for all of said regions is always of the same sign or always of contrary sign with respect to the product of the electric field components to be coupled to each other.

* * * * *